(12) United States Patent
Chen

(10) Patent No.: US 8,200,290 B2
(45) Date of Patent: Jun. 12, 2012

(54) MOBILE PHONE AND METHOD FOR DISPLAYING MEASUREMENT UNIT CONVERSION TOOL THEREOF

(75) Inventor: Chien-Hsiung Chen, Taipei (TW)

(73) Assignee: Inventec Corporation (TW)

( * ) Notice: Subject to any disclaimer, the term of this patent is extended or adjusted under 35 U.S.C. 154(b) by 278 days.

(21) Appl. No.: 12/626,728

(22) Filed: Nov. 27, 2009

(65) Prior Publication Data

US 2010/0137034 A1    Jun. 3, 2010

(30) Foreign Application Priority Data

Nov. 28, 2008   (TW) .............................. 97146331 A

(51) Int. Cl.
*H04B 1/38*    (2006.01)
(52) U.S. Cl. ............... 455/566; 455/404.2; 455/414.2; 455/414.4; 455/456.1; 342/450

(58) Field of Classification Search .................. 455/566, 455/404.2, 414.2, 414.4, 456.1; 342/357, 342/450
See application file for complete search history.

(56) References Cited

U.S. PATENT DOCUMENTS

| | | | | |
|---|---|---|---|---|
| 4,685,116 A | * | 8/1987 | Toumayan | 377/51 |
| 5,546,092 A | * | 8/1996 | Kurokawa et al. | 342/357.52 |
| 5,797,809 A | * | 8/1998 | Hyuga | 473/407 |

* cited by examiner

*Primary Examiner* — Sanh Phu
(74) *Attorney, Agent, or Firm* — Lowe Hauptman Ham & Berner, LLP

(57) ABSTRACT

A mobile phone and a method for displaying measurement unit conversion tool thereof are provided. The method for displaying measurement unit conversion tool of the mobile phone includes the following steps. Firstly, a global positioning system (GPS) signal is captured. Next, a classification of measurement unit is obtained by analyzing the GPS signal. Then, at least a particular measurement unit is obtained according to the classification of measurement unit. Lastly, the particular measurement unit is displayed on the unit conversion tool.

8 Claims, 3 Drawing Sheets

MOBILE PHONE AND METHOD FOR DISPLAYING MEASUREMENT UNIT CONVERSION TOOL THEREOF

This application claims the benefit of Taiwan application Serial No. 97146331, filed Nov. 28, 2008, the subject matter of which is incorporated herein by reference.

BACKGROUND OF THE INVENTION

1. Field of the Invention

The invention relates in general to a mobile phone and a method for displaying measurement unit conversion tool thereof, and more particularly to a mobile phone having a GPS receiving unit and a method for displaying measurement unit conversion tool thereof.

2. Description of the Related Art

Along with the advance in technology, mobile phones are integrated with more and more functions to fit people's various needs. Part of mobile phones are integrated with a unit conversion tool. When the user operates the unit conversion tool, two sets of measurement unit are selected from a unit menu, and after a value corresponding one measurement unit is inputted, a reply value corresponding the other measurement unit is immediately outputted.

However, the arrangement of the unit menu is fixed in a conventional mobile phone. If the measurement unit selected by the user is ranked lower in the unit menu, the user has to spend more search time. Thus, how to reduce the search time for the unit menu has become an imminent issue to the development in the unit conversion tool of the mobile phone.

SUMMARY OF THE INVENTION

The invention is directed to a mobile phone and a method for displaying measurement unit conversion tool thereof which combine the analysis of the GPS signal, hence largely reducing the search time for the applicable measurement unit.

According to a first aspect of the present invention, a method for displaying measurement unit conversion tool of mobile phone is provided. The method for displaying measurement unit conversion tool of the mobile phone includes the following steps. Firstly, a global positioning system (GPS) signal is captured. Next, a classification of measurement unit is obtained by analyzing the GPS signal. Then, at least a particular measurement unit is obtained according to the classification of measurement unit. Lastly, the particular measurement unit is displayed on the unit conversion tool.

According to a second aspect of the present invention, a mobile phone is provided. The mobile phone comprises a global positioning system (GPS) receiving unit, an analysis unit, a display unit and a control unit. The GPS receiving unit is for capturing a GPS signal. The analysis unit is for obtaining a classification of measurement unit by analyzing the GPS signal and for obtaining at least a particular unit of measurement according to the classification of measurement unit. The control unit is for controlling the display unit to display the particular measurement unit on the unit conversion tool.

The invention will become apparent from the following detailed description of the preferred but non-limiting embodiments. The following description is made with reference to the accompanying drawings.

DETAILED DESCRIPTION OF THE INVENTION

The invention is exemplified by a number of embodiments disclosed below. However, the embodiments are for exemplification only, not for limiting the scope of protection of the invention. Also, secondary elements are omitted in the following embodiments to highlight the technical features of the invention.

First Embodiment

Figure 1:
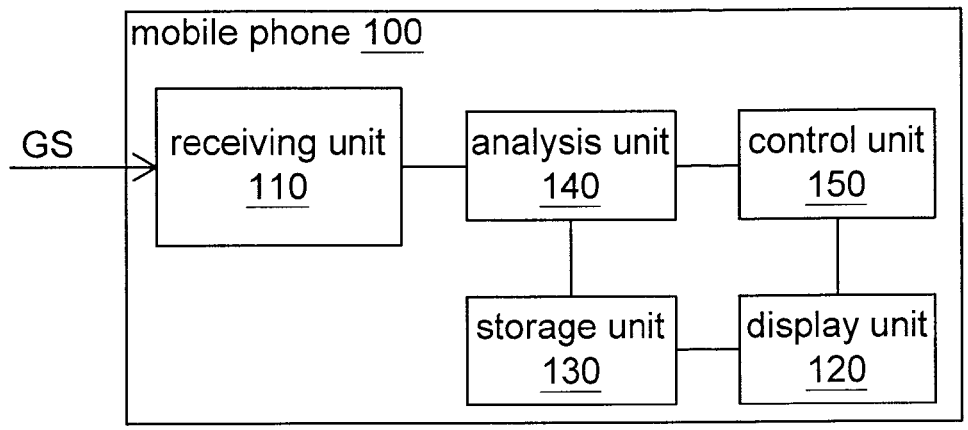
FIG. 1 shows a block diagram of a mobile phone of a first embodiment of the invention.

Referring to FIG. 1, a block diagram of a mobile phone 100 of a first embodiment of the invention is shown. The mobile phone 100 comprises a global positioning system (GPS) receiving unit 110, a display unit 120, a storage unit 130, an analysis unit 140 and a control unit 150. The GPS receiving unit 110 is for capturing a GPS signal GS. The GPS receiving unit 110 is constituted from an antenna and a base frequency conversion chip for example. The display unit 120, used for displaying various items of information, is a liquid crystal display (LCD) or an organic light emitting diode (OLED) display for example. The storage unit 130, used for storing various items of information, is a flash memory for example. The analysis unit 140 is for analyzing various items of information, and the control unit 150 is for controlling various elements. The analysis unit 140 and the control unit 160 are chips, firmware or a number of storage media for storing programming codes.

Figure 2:
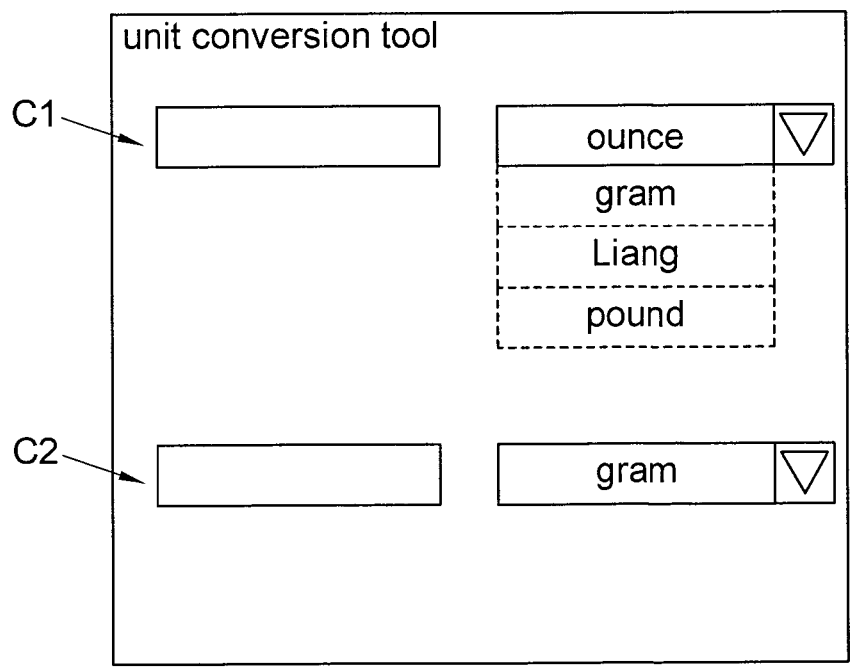
FIG. 2 shows a unit conversion tool of the present embodiment of the invention.

According to the present embodiment of the invention, suitable units are automatically displayed on the unit conversion tool 200 of the mobile phone 100 through the above elements. Referring to FIG. 2, a unit conversion tool 200 of the present embodiment of the invention is shown. The unit conversion tool 200 has a first column C1 and a second column C2. During the journey, a user may find the unit (such as ounce) labeled on the commodity is not the familiar one (such as milliliter). Under such circumstance, the user can convert the unit labeled on the commodity into the unit familiar to the user through the unit conversion tool 200. As indicated in FIG. 2, the first column C1 is for selecting the unit labeled on the commodity, and the second column C2 is for selecting the unit familiar to the user. Through the mobile phone 100 of the present embodiment of the invention, the unit of the first column C1 is automatically selected according to where the user is traveling now.

Figure 3:
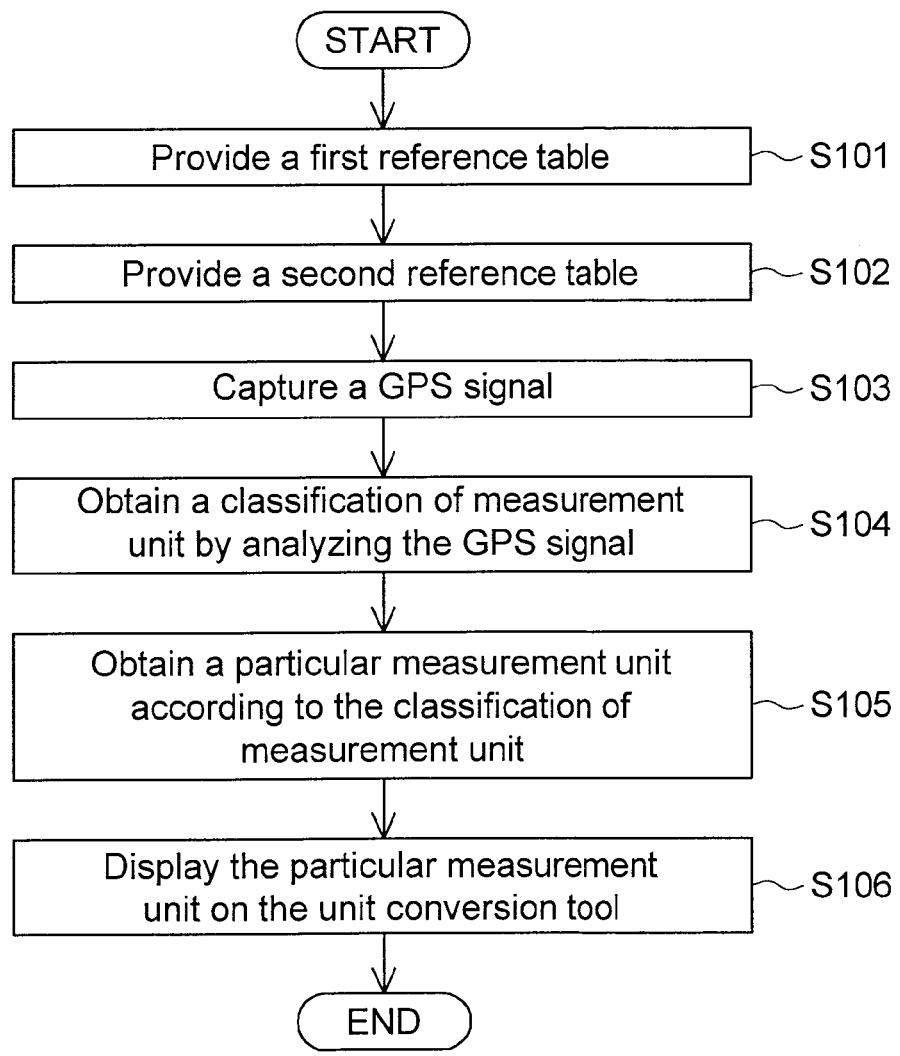
FIG. 3 shows a flowchart of a method for displaying measurement unit conversion tool of mobile phone of a first embodiment of the invention.

The operations of the elements of the present embodiment of the invention are elaborated below in a flowchart. Referring to FIGS. 1-3. FIG. 3 shows a flowchart of a method for displaying measurement unit conversion tool of mobile phone 100 of the first embodiment of the invention. Firstly, the method begins at step S101, a first reference table is provided by a storage unit 130. The first reference table records the correspondence relationship between the GPS signal GS and the classification of measurement unit. The classification of measurement unit is based on continents such as America, Asia, Africa, Europe or Oceania, or based on countries such as China, USA, UK or Canada. The classification of measurement unit is metric measurement or British measurement.

Referring to Table 1, the first reference table of the present embodiment of the invention is shown.

TABLE 1

| GPS Signal GS | | | | |
|---|---|---|---|---|
| Longitude Left Boundary | Longitude Right Boundary | Latitude Top Boundary | Latitude Bottom Boundary | Classification Of Measurement unit |
| E 118 | E 121 | N 26 | N 22 | Metric Measures |
| W 7 | E 2 | N 58 | N 50 | British Measures |
| E 120 | E 122 | N 25 | N 22 | Taiwanese Measures |
| . | . | . | . | . |
| . | . | . | . | . |
| . | . | . | . | . |

The GPS signal GS comprises the longitude and latitude data of the current locality of the mobile phone 100. In the first reference table, the global geography is divided into several rectangular regions according to the data of the longitude left boundary, the longitude right boundary, the latitude top boundary and the latitude bottom boundary. Each region corresponds to one classification of measurement unit. After the longitude and latitude data of the GPS signal GS is obtained, one classification of measurement unit applicable to the current region of the mobile phone 100 is obtained from the first reference table.

Next, the method proceeds to step S102, a second reference table is provided by the storage unit 130. The second reference table records the correspondence relationship between the classification of measurement unit and the particular measurement unit. Referring to Table 2, the second reference table of the present embodiment of the invention is shown.

TABLE 2

| Classification Of Measurement unit | Particular Measurement unit |
|---|---|
| Metric Measures | Kilograms, Meter, Square Centimeters, Tons, Liters, . . . |
| British Measures | Inches, Acres, Miles, . . . |
| Taiwanese Measures | Liang, Jin, . . . |
| Other Non-Metric Measures . . . | . |
| | . |

Then, the method proceeds to step S103, the GPS signal GS is captured by a GPS receiving unit 110.

Next, the method proceeds to step S104, a classification of measurement unit applicable to the current region of the mobile phone 100 is obtained by the analysis unit 140 by analyzing the GPS signal GS and the first reference table.

Then, the method proceeds to step S105, a particular measurement unit applicable to the current region is further obtained by the analysis unit 140 according to the classification of measurement unit and the second reference table.

Next, the method proceeds to step S106, the control unit 150 controls the display unit 120 to display the particular measurement unit on the first column C1 of the unit conversion tool 200. In the current step, the first column C1 can display many categories of units, and the particular measurement unit being obtained is ranked as the first sequence.

Thus, when the user travels around, the user can quickly select the particular measurement unit applicable to the current locality, which is indeed very convenient.

Second Embodiment

Figure 4:
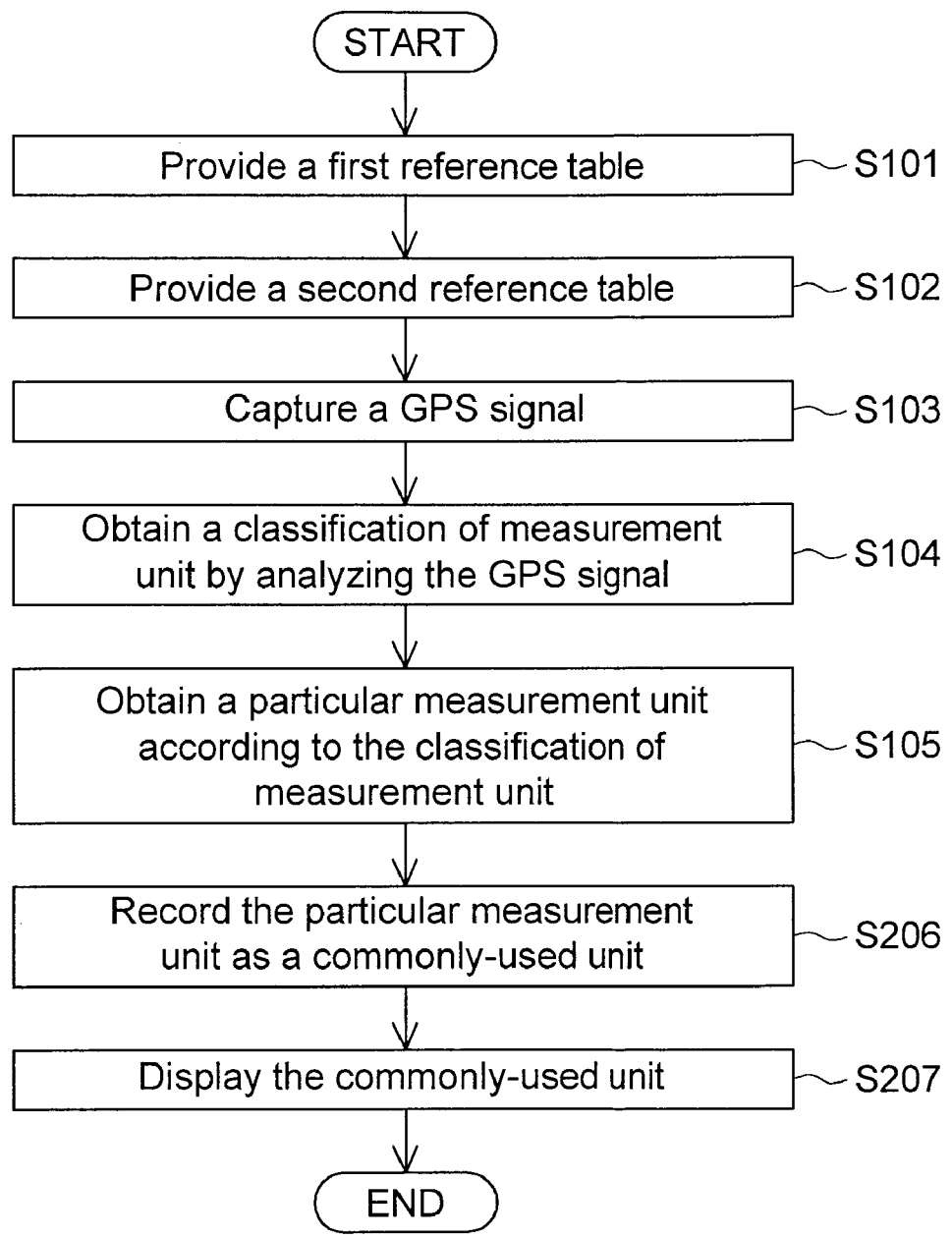
FIG. 4 shows a flowchart of a method for displaying measurement unit conversion tool of mobile phone of a second embodiment of the invention

Referring to FIG. 4, a flowchart of a displaying method of the unit conversion tool 200 of mobile phone 100 of a second embodiment of the invention is shown. The method of the unit conversion tool 200 of the mobile phone 100 of the present embodiment of the invention differs with the method of the unit conversion tool 200 of the mobile phone 100 of the first embodiment in that step S106 of FIG. 3 is replaced by steps S206~S207.

Firstly, the method begins at step S101~S105, after the particular measurement unit is obtained by the analysis unit 140, the method proceeds to step S206.

Next, the method proceeds to step S206, the storage unit 130 recorded the particular measurement unit as a commonly-used unit.

Then, the method proceeds to step S207, the control unit 150 controls the display unit 120 to directly display the commonly-used unit on the first column C1 of the unit conversion tool.

Thus, after the user obtains the GPS signal GS from a locality, the user can direct obtain the commonly-used unit without going through tedious process of analysis next time when the user is at the same locality again.

The mobile phone and the method for displaying measurement unit conversion tool thereof disclosed in the above embodiments of the invention combines the analysis of the GPS signal, and provides the mobile phone and the method for displaying measurement unit conversion tool thereof with many advantages partly disclosed below.

Firstly, when the user travels around, the user can quickly select the particular measurement unit applicable to the current locality, which is indeed very convenient.

Secondly, as the particular measurement unit is ranked as the first sequence and other units of measurement are still listed after the particular measurement unit for the user to select. Thus, despite the particular measurement unit being obtained is not what the user needs, the user still can select the applicable unit that fits the needs.

Thirdly, the particular measurement unit being obtained can be recorded, so that the user can direct obtain the commonly-used unit without going through tedious process of analysis next time when the user is at the same locality again.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for displaying measurement unit conversion tool of mobile phone, comprising:
    capturing a global positioning system (GPS) signal;
    obtaining a classification of measurement unit by analyzing the GPS signal;
    obtaining at least a particular measurement unit according to the classification of measurement unit;
    displaying the particular measurement unit on the unit conversion tool;

providing a first reference table, wherein the first reference table records the correspondence relationship between the GPS signal and the classification of measurement unit of; and providing a second reference table, wherein the second reference table records the correspondence relationship between the classification of measurement unit and the particular measurement unit.

2. The method for displaying measuring unit conversion tool of mobile phone according to claim 1, wherein in the step of displaying the particular measurement unit, the particular measurement unit corresponding to the classification of measurement unit is ranked as the first sequence.

3. The method for displaying measurement unit conversion tool of mobile phone according to claim 1, wherein the classification of measurement unit comprises a metric measurement and a British measurement.

4. The method for displaying measurement unit conversion tool of mobile phone according to claim 1, further comprising:
   recording the particular measurement unit as a commonly-used unit; and
   displaying the commonly-used unit.

5. A mobile phone, comprising:
   a global positioning system (GPS) receiving unit for capturing a GPS signal;
   an analysis unit for obtaining a classification of measurement unit by analyzing the GPS signal and for obtaining at least a particular measurement unit according to the classification of measurement unit;
   a display unit;
   a control unit for controlling the display unit to display the particular measurement unit on the unit conversion tool; and
   a storage unit for storing a first reference table and a second reference table, wherein the first reference table records the correspondence relationship between a local region of the mobile phone and the classification of measurement unit, and the second reference table records the correspondence relationship between the classification of measurement unit and the particular measurement unit.

6. The mobile phone according to claim 5, wherein the display unit ranks the particular measurement unit corresponding to the classification of measurement unit as the first sequence.

7. The mobile phone according to claim 5, wherein the classification of measurement unit comprises metric measurement and British measurement.

8. The mobile phone according to claim 5, further comprising:
   a storage unit for recording the particular measurement unit being a commonly-used unit, wherein the display unit further displays the commonly-used unit.

* * * * *